United States Patent    [15] 3,654,477
Benjamin, Jr.    [45] Apr. 4, 1972

[54] OBSTACLE DETECTION SYSTEM FOR USE BY BLIND COMPRISING PLURAL RANGING CHANNELS MOUNTED ON SPECTACLE FRAMES

[72] Inventor: J. Malvern Benjamin, Jr., Philadelphia, Pa.

[73] Assignee: Bionic Instruments, Inc., Bala Cynwyd, Pa.

[22] Filed: June 2, 1970

[21] Appl. No.: 42,796

[52] U.S. Cl. .................. 250/217 SS, 250/221, 250/222 R, 250/239, 340/228 S, 340/407
[51] Int. Cl. ................. G06m 7/00, H01j 5/02, H01j 39/12
[58] Field of Search .................. 340/407, 228 S; 3/1; 250/217 SS, 221, 222, 215, 216, 239; 35/35

[56] References Cited

UNITED STATES PATENTS

| | | | |
|---|---|---|---|
| 2,703,344 | 3/1955 | Anderson | 35/35 |
| 3,428,815 | 2/1969 | Thompson | 250/222 X |
| 3,369,228 | 2/1968 | Foster | 340/228 S |
| 3,474,252 | 10/1969 | Jacobsen | 250/216 |
| 2,966,824 | 1/1961 | Granquist | 250/216 X |

*Primary Examiner*—James W. Lawrence
*Assistant Examiner*—T. N. Grighsby
*Attorney*—Howson and Howson

[57] ABSTRACT

In an obstacle detection device for the blind a coherent light source is pulsed on to produce a pulse of light which is reflected by an obstacle. The reflected light is received adjacent the coherent light source and the time between the transmission and reception of the pulse is used to measure the relatively short distances involved. Solid state lasers and photopickups in such a system can be included in eye-glasses to be accommodated in the space between the lens area and the wearer's eye. Other embodiments include hand-held systems, such as a flashlight-like device, or typhlo cane combinations. A tactile stimulator directed to a sensitive body area supported on the same frame employs material which changes shape when temperature exceeds a critical level and returns to its original shape when cooled below that temperature such that internal resistance of the material under the effect of AC current constantly cyclically changes above and below the critical temperature.

5 Claims, 8 Drawing Figures

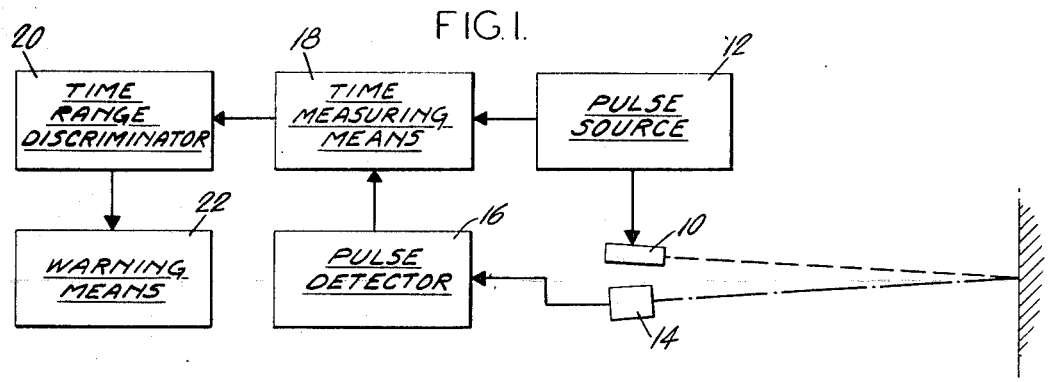
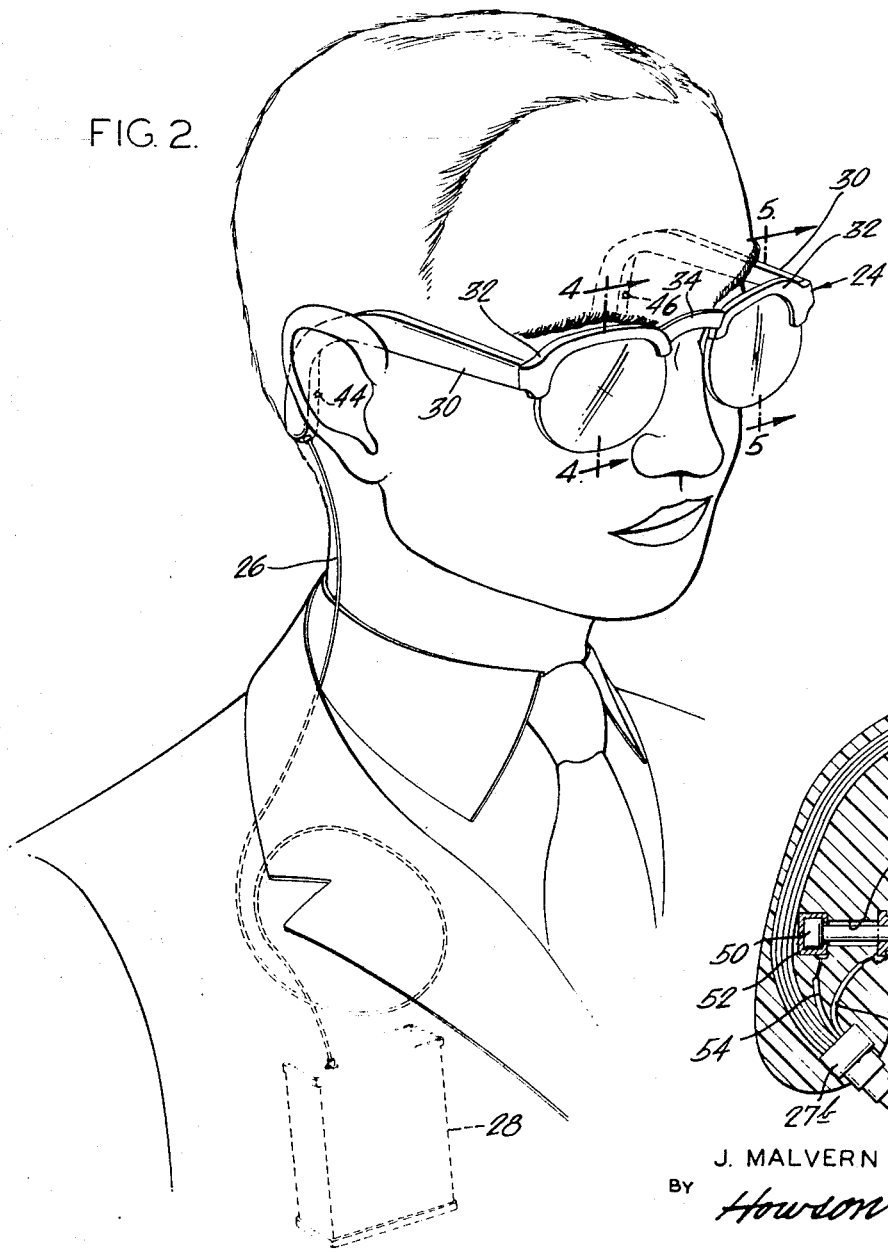
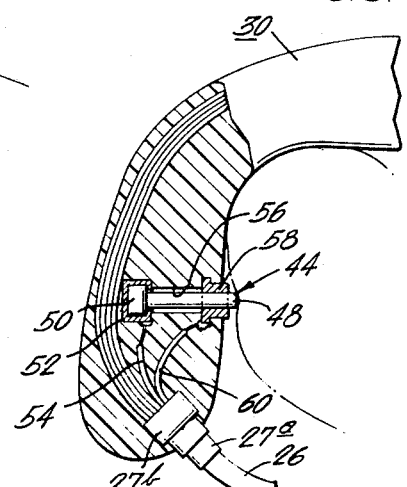
INVENTOR:
J. MALVERN BENJAMIN, JR.
BY Howson & Howson
ATTYS.

INVENTOR:
J. MALVERN BENJAMIN, JR.
BY Howson & Howson
ATTYS.

INVENTOR:
J. MALVERN BENJAMIN, JR.
BY Howson & Howson
ATTYS.

OBSTACLE DETECTION SYSTEM FOR USE BY BLIND COMPRISING PLURAL RANGING CHANNELS MOUNTED ON SPECTACLE FRAMES

The present invention relates to an obstacle detection means for use by the blind. It employs a time-of-flight ranging system comprising a source of coherent light which is pulsed on at selected intervals, suitable detection means for detecting reflected pulses and means whereby the time interval between transmission and reception of the pulses can be measured. Furthermore, it has the advantage of being compact, so that it can be used in connection with the lenses of eye-glasses, as well as with more conventional support and conveying structures.

In the prior art time limitations have made it more practical to use radar or radar-like systems only over relatively long distances. Recently coherent visible light has been used in radar or radar-like applications. The present invention employs such coherent light as a satisfactory ranging tool for distances down to a few feet. In particular the present invention employs coherent visible light in such ranges for obstacle detection devices used by the blind.

Obstacle detection devices for the blind have taken a great many forms in the prior art. In application Ser. No. 632,665 now U.S. Pat. No. 3,546,467, my prior joint invention with Duane Ridgely Bolgiano, Edwin Donnell Meeks, Jr., and Thomas A. Benham for "Obstacle Detection Device," filed Apr. 21, 1967, there is described a typhlo cane, such as that normally used by the blind, which has auxiliary obstacle detection means in the form of a laser light source and suitable light pickup elements. In that application, however, the light from the laser source is separated from its pickup and used merely to generate a spot of light which is sensed by the pickup until it is "lost" by being displaced to a position where it cannot be picked up. In this prior art device and others known to me for use by the blind no attempt has been made to do ranging by time-of-flight measurement of light. Typically in the prior art the light source and the pickup have not been essentially at the same point as they must be in the present invention to accomplish ranging. Rather in many cases it has been desirable to spread their positions as far apart as possible for the purpose of triangulation and lost light spot techniques.

A typhlo cane may be used in accordance with the present invention and provides a very desirable means of employing the present invention, but it does not provide the special advantage of spread between source and pickup that it did in the above-mentioned invention. Much more compact hand-held devices other than canes, such as a device the size and shape of a flashlight, can also be used with the present invention. A preferred embodiment of the present invention, however, is in combination with a pair of eye-glass frames wherein the lenses are replaced by a laser light source and suitable pickup means, as well as lens and/or mirror means appropriate to that use, as required. The present invention also contemplates that the system may be optically a lens system, a mirror system, or a mixed system, sometimes known as a catadiotropic system.

Also contemplated within the scope of the present invention is a tactile stimulator which may be employed in place of known tactile stimulators or in place of audible means as a means of warning. This stimulator simply consists of a bar of Nitinol, which has been found to have characteristics rapidly responsive to heat and cold. Nitinol has the property of returning to a prior condition from a deformed condition when heated and assuming its previous deformed condition when cooled. The temperature range required for this change is narrow and the material is immediately responsive. Consequently, current flow through the internal resistance of the material produces sufficient heating and use of alternating current of sufficient applitude allows alternating the heating with cooling sufficient to change state and produce a vibration. Particularly when one end of the Nitinol bar is held, the vibrating end of the bar can then be used to contact a sensitive area of the skin as a tactile stimulator.

For a better understanding of the present invention reference is made to the accompanying drawings showing various embodiments of the present invention in which:

FIG. 1 is a schematic diagram of the electronic ranging system of the present invention;

FIG. 2 is a perspective drawing showing a pair of spectacles embodying the present invention being worn by a subject;

FIG. 3 is a drawing enlarged from the scale of FIG. 2 showing the end of one of the bows of the glasses partially in section in order to shown a novel tactile simulator;

Figure 4:
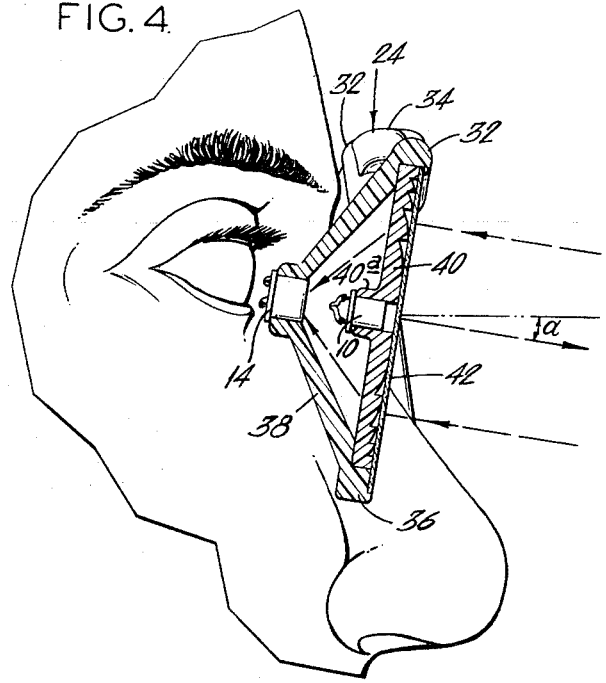
FIG. 4 is an enlarged sectional view along line 4—4 of FIG. 2.

Referring first to FIG. 1, the diagram illustrates a ranging circuit for determining the range or distance of an obstacle by time-of-flight ranging. Laser 10, which, for example, may be of the gallium arsenide type, produces a short burst of coherent light when pulsed on by pulse source 12. Pulse source 12 produce energizing pulses of short duration at relatively long intervals compared with the time required for light from the laser source to be reflected back to the proximity of the source. Both laser 10 and pulse source 12 are preferably of compact solid state form. In the proximity of the source, and as close to the source position as possible, is a photopickup 14 which may be a solid state photo-diode or other suitable device. The signal detected by the photo-diode 14 is fed to a pulse detector circuit 16 for amplification, noise elimination and whatever other purposes may be required by or desirable for the specific application in which it is used. The received pulse signal is fed thence to time measuring means 18 which also receives the transmitted pulse from pulse source 12 and measures the time interval between the two pulses. A range is set to select a signal representative of the time difference. This signal is, in turn, fed to the time range discriminator 20 which is set to select the range within which a warning will be given, which range is preferable adjustable. In response to a signal within the selected range an output is provided to the warning means 22.

Each of the components shown in a box in FIG. 1 involves well-known circuitry. It is the combination of these components with certain apparatus for the special application of aids for the blind which is novel. It will be understood that a separate system of this general type is used for each associated pair of laser and photopickup.

Referring to FIGS. 2 through 5 a preferred embodiment of the present invention is shown. In the prior art so-called "obstacle detection" devices for the blind have been confined to various hand-held devices which devices are conspicuous and often very cumbersome to carry. In accordance with the present invention the requirement that obstacle detection devices be hand-held is eliminated, or at least made optional.

As seen in FIG. 2 the preferred embodiment of the present invention consists of a pair of spectacles, or eye-glasses 24. Appropriate cable connection is made from the eye-glasses 24 through a multi-conductor cable 26 to a canister 28, which may contain a battery or other appropriate power source and such electronics as cannot conveniently be placed in the eye-glasses.

The eye-glasses 24 are of conventional appearance. Bows 30 support the glasses in conventional fashion over the ears of the wearer. Lens frames 32 in this case support the solid state laser light source 10 and photo-diode pickup means 14 of the ranging system. The lens frames are connected together by a bridge 34 in conventional form.

Figure 5:
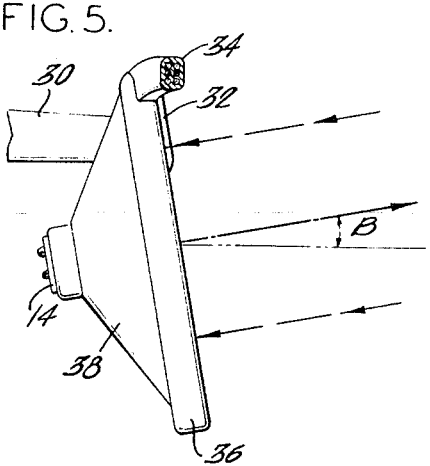
FIG. 5 is an enlarged sectional view along line 5—5 of FIG. 2.

FIGS. 4 and 5 show the details of the optical system including its light source and photopickup. As shown the lens frame portion 32 have frames 36 which are extended by a conical housing 38 toward the position of the wearer's eye. This housing, although shallow, is sufficiently deep to permit the photopickup 14 to be supported on its axis near the conical apex. As shown the housing is sufficiently shallow to keep the pickup well spaced from the eye of the wearer. The laser light source 10 is coaxially located with the pickup 14 but spaced away from the pickup 14. The laser light source is supported by a Fresnel lens 40 having a central cylindrical aperture in which it is snugly engaged. The lens blank is formed with a tubular extension 40a giving support over a greater length. Covering the lens is a thin disc of light filtering material 42 which gives the glasses a more natural external appearance so that they appear to be dark glasses and the interior of the housing 38 will not be visible. The wavelength of the light emitted by the laser passes through the filter readily.

Figure 6:
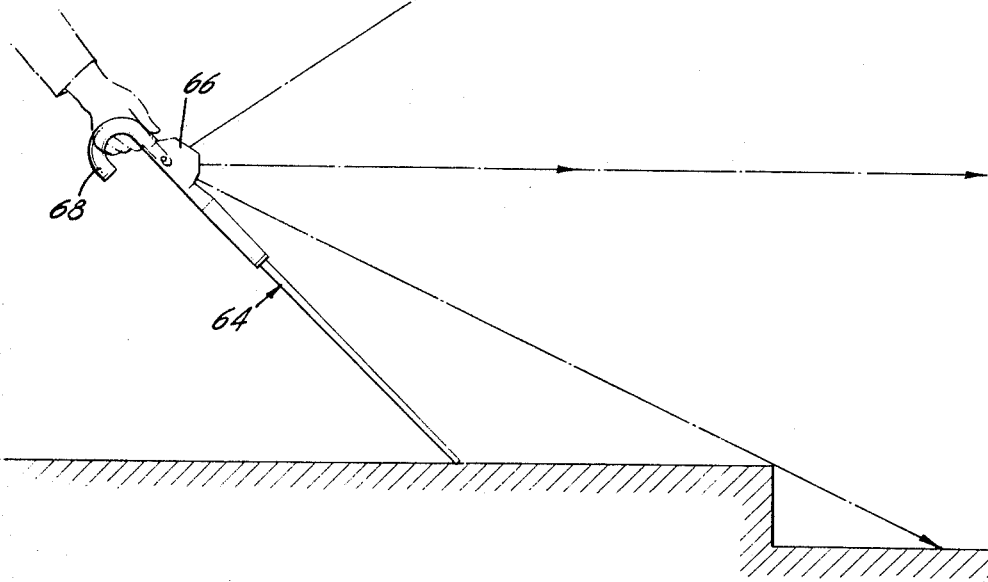
FIG. 6 is a schematic diagram showing a modified typhlo cane embodiment of the present invention.

As indicated in FIGS. 4 and 5 the lenses may be differently tilted so that one effectively is directed slightly downwardly and the other is directed slightly upwardly. The amount of tilt is a function of range intended and is a matter of design and determines how far in advance of a wearer of a particular height the beam will strike the ground and how far ahead a head level obstacle will be detected. More specifically the laser of FIG. 4 is directed downwardly to detect a discontinuity in the pavement or walkway, such, for example, as a step-down, as illustrated in FIG. 6. As shown the light from source 10 is directed downwardly at an angle below the horizontal, strikes the pavement and that portion which is reflected directly back is picked up by the Fresnel lens and refracted into paths impinging upon the photopickup 14. The ranging system is designed such that as long as the distance between the lens 40 and the ground along the light path at angle α to the horizontal remains within a general range which allows for irregularities, a downgrade of a predetermined pitch or an upgrade of a predetermined pitch, no signal will occur. However, if a discontinuity, such as a down curb of more than a predetermined critical height occurs, the longer period required for the signal to return to the pickup will cause the system of FIG. 1 to generate a signal of one predetermined type. On the other hand, the occurrence of an up step or wall will cause the light return time to be shorter than normal. The shorter than normal period will cause the system of FIG. 1 to generate a signal of a second predetermined type. Separate alarm means can be used for the down step different from that for the up step. The alarm means, moreover, need not be another device of the same type but, for example, might be an aural alarm, such as a buzzer, when the signal of the first type is tactile.

The lens shown in FIG. 5, which in all other respects is similar to the system of FIG. 4, has its laser light source 10 directed upwardly so that light from the laser assumes path having an angle β above the horizontal. Ordinarily no signal is received, but, should an obstacle be encountered, light will be reflected back through its Fresnel lens into its photopickup 14. Its system corresponding to FIG. 1 is preferably so arranged however that only when the obstacle is within a predetermined distance from the laser will a signal be generated.

In addition to audible signals such as buzzers, bells, or the like, it is possible to use tactile stimulation which is apparent only to the wearer and not to a passerby.

A novel and preferred type of tactile stimulator is shown in the structure of FIG. 2 and in detail in the enlarged drawing of FIG. 3. As seen in FIG. 2 a first stimulator 44 is located behind the right ear and a second stimulator 46 behind the left ear. These stimulators are associated with the right and left lens laser systems, respectively, and, since each is similar to the other, only stimulator 44 needs to be further described. As shown in FIG. 3 the stimulator 44 consists primarily of a rod 48 which has an enlarged head 50 which is soldered or otherwise intimately bonded to a sheath 52 of high conductivity metal which, in turn, is connected by suitable solder connection to a lead 54. The head 50 and its sheath 52 are molded rigidly into the body of the material of the bow 30 of the glasses and the rod extends through an enlarged channel or bore 56 and through a forward bearing 58 of high conductivity material which snugly engages the material of rod 48 in an intimate sliding contact. The bearing 58 is soldered or otherwise conductively connected to conductor 60. The bearing 58 is molded in position in its supporting bow 30 to provide a bearing for movable end of rod 48 as it expands. The rod 48 is made of the alloy Nitinol which has the property of assuming a fixed, predetermined shape and size which it assumes upon cooling below a critical temperature and another shape and size which it assumes upon heating above that critical temperature. Heating is accomplished by the internal resistance of the Nitinol rod 58 which receives current flow through the leads 54 and 60 by way of the connector 52 and the bearing 58. The temperature response of the Nitinol rod is such that the application of an alternating current will cause it to alternate quickly in size in response to the alternate heating and cooling. The current must be selected to be of sufficient magnitude at its highest amplitude to heat the rod above the critical temperature and of sufficiently low amplitude to allow cooling below the critical temperature at intermediate points. Timing, as well as maxima and minima of amplitude is critical. The change in size results in a constant vibration which is applied as shown here to a sensitive part of the body. Such a sensitive spot is the back-side of the ear and the stimulator may be located to contact this area as shown in FIG. 3 and FIG. 2 at two points by inclusion of appropriate points at the end of the bows. Warning signals to warning means 22 in FIG. 1 permit current from a current supply to flow to the stimulator through leads 54 and 60 for activation. As shown in FIG. 3 multi-conductor cable 26 may be connected to the conductors through the spectacles by a plug 27a within socket 27b in the bow 30. Conductors to each of the laser and photopickup elements are provided, including additional conductors not seen in the cross-section of FIG. 3. There are provided at least a pair of conductors for each of the lasers, a pair for each of the photopickups and a pair carrying the alternating current to the stimulator 46. Therefore there must be at least six conductors, shown in cross-section in FIG. 5, crossing the bridge of the glasses, assuming the power supply and electronics to be located in the canister 28.

Figure 7:
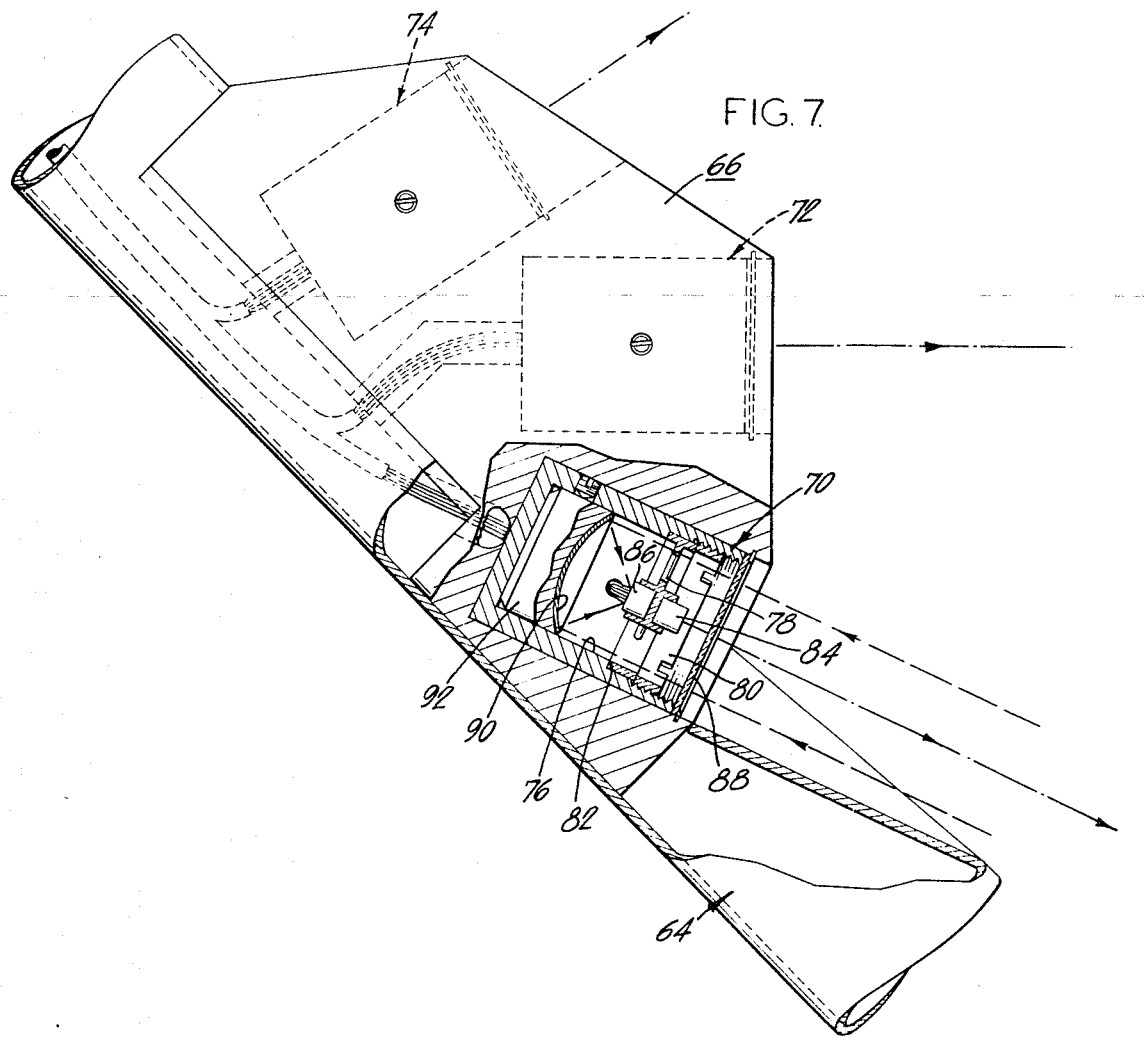
FIG. 7 is an enlargement of the transmitter and receiver area of the typhlo cane of FIG. 6.

The present invention is by no means confined to the embodiments of FIGS. 2-5. A typhlo cane embodiment is shown in FIGS. 6 and 7 which it will be observed differs from the embodiment shown in application Ser. No. 632,655 wherein the source of light and the point of pickup were separated in order to facilitate the technique of apparently shifting or hiding the light spot to prevent its detection under selected circumstances. Since the present invention employs time of flight ranging, the most desirable possibility is to have the laser and the photopickup at the same position. In practice this cannot be exactly accomplished but an approximation can be accomplished which is reasonably accurate. As seen in FIG. 6 the typhlo cane 64 includes a housing 66 near its crooked handle 68 containing three separate laser and light pickups as seen in FIG. 7. The electronics and batteries to provide the power for the cane are preferably located in the crooked handle 68. Then, as seen in FIG. 7, necessary cables are fed down the hollow of the cane to each of the units. Suitable tactile stimulators and/or audible warning devices are employed in combination with each of the three ranging systems. The optical systems employed are generally designated, respectively, 70, 72 and 74. Each of these is preferably contained within a cylindrical cup 76 which is snugly received within a socket in the housing 66 and which is removably fixed in place by locking set screws, as shown. Unit 70 will be taken as typical and described, it being understood the other units are identical.

The cup 76 has an inner cylindrical diameter which differs at different places along its length. A spider 78 held in place by a ring 80 whose outer periphery is threaded to match threads in the inner wall of the cup housing 76 near the lip of the cup. Ring 80 holds spider 78 against the shoulder 82 between two inner diameters of the cup 76. The spider, in turn, supports a laser 84 and a photodiode 86 on opposite sides in axially aligned but oppositely directed sockets. The laser 84 produces light which is projected axially through a cover plate 88 transparent to at least some light frequencies and through cover plate 88 reflected light returns back directly and is collected by concave mirror 90 on block 92 which directs the light to the photopickup 86. The circuitry is similar to that described in connection with FIG. 1 and the embodiment of FIGS. 2–5.

Referring to FIG. 6 it will be observed that the optical unit 70 directs its laser beam downwardly and acts to detect discontinuities, such as down steps or holes in the pavement. The optical unit 72 directs its beam directly ahead of the path of travel of the riser of the cane. In this way it will detect people or other obstacles in the path of persons using the cane. Optical unit 74 is directed upwardly to detect an overhang 86.

Figure 8:
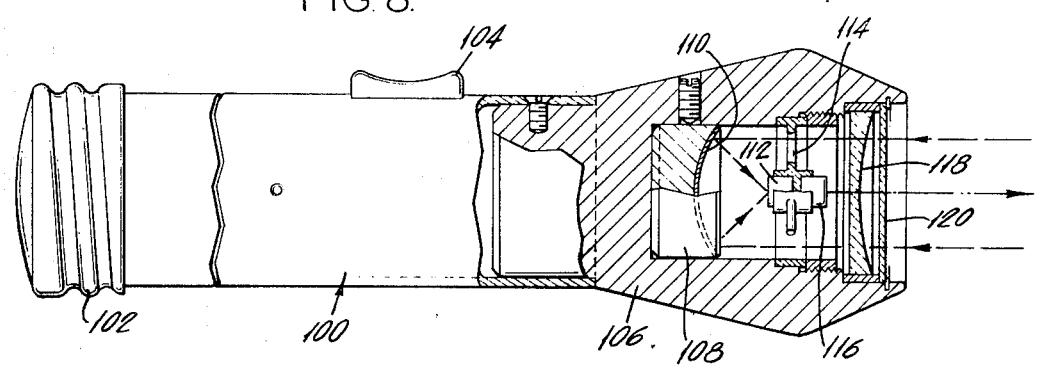
FIG. 8 is a flashlight embodiment of the present invention in partial section.

In a given situation it may not be necessary to have a unit as complicated either as the glasses of FIGS. 2–5 or as the described cane system. Since the system of the present invention lends itself to compactness, it can be contained within an ordinary flashlight casing 100 (FIG. 8) providing a typical battery compartment and a cylindrical electronics compartment combined with a removable screw-off end cap 102. A typical finger operated switch 104 and a block enclosure 106 complete the structure. Within the block is a cylindrical counter-bored structure having three distinct diameters which progress in size in the axial direction toward the open end. The counter-bored structure is similar in many ways to the structure of optical unit 70 described above. In the bottom of the cup in the smallest diameter is located a block 108 providing a concave mirror 110 which receives reflected light and directs it to a photo-diode 112, corresponding to 14 in FIG. 1. The same spider support 114 which the photo-diode 112 can also be used to carry a laser 116 with the laser 116 placed back-to-back to the photopickup 112, both of the axially aligned as in the FIG. 7 embodiment. A convex lens 118 and a flat disc glass cover 120 complete the structure. The laser projects light outwardly and reflections are accumulated by the mirror 10 as previously described which directs the light in turn to the photopickup 112.

Structures shown and described in the three embodiments discussed are intended to be merely by way of example and do illustrate lens, mirror and combinations of such optical systems. It will be clear that these and other portions of the system can be varied within the scope of the invention and all such variation within the scope of the claims are intended to be within the scope and spirit thereof.

I claim:

1. An obstacle detection system for use by the blind to monitor at least two conditions and give early warning of obstacles in at least two locations comprising,
   spectacles including a nose piece, bows, and a pair of lens holders having cooperating structure supporting
   at least two light sources directed in different directions for producing light,
   separate light collection means associated with each of said at least two light sources, each differently directed from the other to collect light originating from its associated light source and reflected by surfaces upon which light from that light source impinges,
   separate light detection means positioned to receive light collected by each of said light collection means,
   separate measuring means coupled to each of the light sources and its respective associated light detection means to measure the distance to the respective surfaces illuminated, and
   separate stimulator means responsive to the respective measuring means to provide at least two separate warning signals.

2. The obstacle detection system of claim 1 in which the light sources are pulse light sources and the measuring means measures distance by measuring the time between when a light pulse leaves a light source and that reflected light pulse is received at its associated light collection means.

3. The obstacle detection system of claim 2 in which the light source is a solid state laser and its associated detection means is a solid state photopickup positioned back-to-back on the axis of a mirror which collects reflected light and directs it toward the photopickup.

4. The obstacle detection system of claim 2 in which each light source is a laser and each detection means is a solid state photo-sensitive device in which the laser is located in a central aperture of a lens and its associated photopickup is supported coaxially behind the laser in position for the lens to direct reflected light back to its associated photopickup.

5. The obstacle detection system of claim 4 in which the light source is a laser coaxially supported by a lens in an axial hole through the lens, said lens in turn being supported by the glasses frame, and in which the frame structure is extended backward to provide a support for the photopickup coaxial with the axis of the laser.

* * * * *